United States Patent
Borse et al.

(10) Patent No.: US 12,234,347 B2
(45) Date of Patent: Feb. 25, 2025

(54) BIMODAL POLYETHYLENE HOMOPOLYMER COMPOSITION

(71) Applicant: Univation Technologies, LLC, Houston, TX (US)

(72) Inventors: Nitin Borse, Pearland, TX (US); Swapnil B. Chandak, Pearland, TX (US); Ayush A. Bafna, Manvel, TX (US); Roger L. Kuhlman, Lake Jackson, TX (US); Joel D. Wieliczko, South Charleston, WV (US); John F. Szul, Hurricane, WV (US); Chuan C. He, Houston, TX (US); Charles D. Lester, South Charleston, WV (US)

(73) Assignee: UNIVATION TECHNOLOGIES, LLC, Houston, TX (US)

( * ) Notice: Subject to any disclaimer, the term of this patent is extended or adjusted under 35 U.S.C. 154(b) by 591 days.

(21) Appl. No.: 17/754,006

(22) PCT Filed: Sep. 22, 2020

(86) PCT No.: PCT/US2020/051907
§ 371 (c)(1),
(2) Date: Mar. 21, 2022

(87) PCT Pub. No.: WO2021/061597
PCT Pub. Date: Apr. 1, 2021

(65) Prior Publication Data
US 2022/0325083 A1   Oct. 13, 2022

Related U.S. Application Data

(60) Provisional application No. 62/906,308, filed on Sep. 26, 2019.

(51) Int. Cl.
*C08L 23/06* (2006.01)
*C08F 110/02* (2006.01)

(52) U.S. Cl.
CPC ............ *C08L 23/06* (2013.01); *C08F 110/02* (2013.01); *C08L 2201/14* (2013.01); *C08L 2205/025* (2013.01); *C08L 2207/062* (2013.01)

(58) Field of Classification Search
CPC . C08L 23/06; C08L 2201/14; C08L 2207/062
See application file for complete search history.

(56) References Cited

U.S. PATENT DOCUMENTS

| | | |
|---|---|---|
| 3,709,853 A | 1/1973 | Karapinka |
| 4,003,712 A | 1/1977 | Miller |
| 4,011,382 A | 3/1977 | Levine et al. |
| 4,302,566 A | 11/1981 | Karol et al. |
| 4,453,399 A | 6/1984 | Thompson |
| 4,543,399 A | 9/1985 | Jenkins et al. |
| 4,588,790 A | 5/1986 | Jenkins, III et al. |
| 4,882,400 A | 11/1989 | Dumain et al. |
| 4,988,783 A | 1/1991 | Beran et al. |
| 4,994,534 A | 2/1991 | Rhee et al. |
| 5,332,706 A | 7/1994 | Nowlin et al. |
| 5,352,749 A | 10/1994 | DeChellis et al. |
| 5,462,999 A | 10/1995 | Griffin et al. |
| 5,541,270 A | 7/1996 | Chinh et al. |
| 5,627,242 A | 5/1997 | Jacobsen et al. |
| 5,665,818 A | 9/1997 | Tilston et al. |
| 5,677,375 A | 10/1997 | Rifi et al. |
| 5,882,750 A | 3/1999 | Mink et al. |
| 6,489,408 B2 | 12/2002 | Mawson et al. |
| 6,787,608 B2 | 9/2004 | VanDun et al. |
| 6,989,344 B2 | 1/2006 | Cann et al. |
| 7,078,467 B1 | 7/2006 | Kolb et al. |
| 7,090,927 B2 | 8/2006 | Shannon et al. |
| 7,157,531 B2 | 1/2007 | Szul et al. |
| 7,223,825 B2 | 5/2007 | Kolb et al. |
| 7,300,988 B2 | 11/2007 | Kolb et al. |
| 7,632,907 B2 | 12/2009 | Sukhadia et al. |
| 7,754,840 B2 | 7/2010 | Loveday et al. |
| 7,951,883 B1 | 5/2011 | Mehta et al. |
| 8,227,552 B2 | 7/2012 | Kolb et al. |
| 8,476,394 B2 | 7/2013 | St. Jean et al. |
| 8,497,329 B2 | 7/2013 | Kolb et al. |
| 9,284,391 B2 | 3/2016 | Hlavinka et al. |
| 9,629,805 B2 | 4/2017 | Karakatsani et al. |
| 9,644,087 B2 | 5/2017 | Aubee et al. |
| 9,850,369 B2 | 12/2017 | Aubee et al. |
| 10,066,093 B2 | 9/2018 | Aubee et al. |
| 2002/0150648 A1 | 10/2002 | Cree |

(Continued)

FOREIGN PATENT DOCUMENTS

| | | | |
|---|---|---|---|
| CN | 101535398 A | 9/2009 | |
| EP | 0649992 B1 | 7/1997 | |
| EP | 0794200 A | 9/1997 | |
| EP | 0634421 B1 | 10/1997 | |
| EP | 0802202 A | 10/1997 | |
| EP | 2507273 B1 | 7/2015 | |
| EP | 2751145 B1 | 7/2017 | |
| EP | 3199342 B1 | 2/2019 | |
| WO | 2005090464 A1 | 9/2005 | |
| WO | WO-2006045550 A1 * | 5/2006 | ............... C08J 5/18 |
| WO | 2017132092 A1 | 8/2017 | |

(Continued)

OTHER PUBLICATIONS

Williams, "The Construction of a Polyethylene Calibration Curve for Gel Permeation Chromatography using Polystyrene Fractions," 1968, vo. 6, p. 621.

(Continued)

*Primary Examiner* — Patrick D Niland

(57) ABSTRACT

A nucleating agent-free and LLDPE-free polyolefin composition for making films with enhanced barrier properties against water vapor and oxygen gas. Related aspects include formulations, manufactured articles, films, and methods.

12 Claims, No Drawings

(56) References Cited

U.S. PATENT DOCUMENTS

| | | | |
|---|---|---|---|
| 2005/0085600 A1* | 4/2005 | Ehrman | C08F 10/00 |
| | | | 526/905 |
| 2012/0058324 A1 | 3/2012 | St. Jean et al. | |
| 2013/0225743 A1 | 8/2013 | Aubee et al. | |
| 2016/0068623 A1 | 3/2016 | Kapur et al. | |
| 2016/0297907 A1 | 10/2016 | Goode et al. | |
| 2019/0048155 A1 | 2/2019 | Nieto et al. | |
| 2019/0144649 A1 | 5/2019 | Lam et al. | |

FOREIGN PATENT DOCUMENTS

| | | | | |
|---|---|---|---|---|
| WO | 2018089195 A1 | 5/2018 | | |
| WO | WO-2018089193 A1 * | 5/2018 | | C08F 10/02 |
| WO | WO-2019051006 A1 * | 3/2019 | | C08F 210/16 |

OTHER PUBLICATIONS

PCT/US2020/051907, Search Report and Written Opinion with a mailing date of Dec. 8, 2020.

PCT/US2020/051907, International Preliminary Report on Patentability with a mailing date of Apr. 7, 2022.

\* cited by examiner

BIMODAL POLYETHYLENE HOMOPOLYMER COMPOSITION

FIELD

Polyethylene polymers, formulations, films, and methods.

INTRODUCTION

Patent application publications in or about the field include US 2016/0068623 A1; US 2016/0297907 A1; WO 2017/132092 A1; and US 2019/0048155 A1. Patents in or about the field include U.S. Pat. Nos. 5,332,706; 5,882,750; 6,787,608 B2; U.S. Pat. No. 6,989,344 B2; U.S. Pat. No. 7,078,467 B1; U.S. Pat. No. 7,090,927 B2; U.S. Pat. No. 7,157,531 B2; U.S. Pat. No. 7,223,825 B2; U.S. Pat. No. 7,300,988 B2; U.S. Pat. No. 7,632,907 B2; U.S. Pat. No. 7,754,840 B2; U.S. Pat. No. 7,951,883 B2; U.S. Pat. No. 8,227,552 B2; U.S. Pat. No. 8,476,394 B2; U.S. Pat. No. 8,497,329 B2; U.S. Pat. No. 9,284,391 B2; and U.S. Pat. No. 10,066,093 B2.

For making films, some prior polyolefin formulations comprise a polyolefin polymer and a nucleating agent, which typically is a small-molecule metal carboxylate salt. The nucleating agent enhances nucleation of a melt of the polyolefin polymer during a film-forming process.

For making films, other prior polyolefin formulations comprise a linear low-density polyethylene (LLDPE). The LLDPE may function to enhance a film barrier property.

SUMMARY

We describe a nucleating agent-free and LLDPE-free polyethylene composition for making films with enhanced barrier properties against transmission of water vapor and oxygen gas. Related aspects include formulations, manufactured articles, films, and methods of making and using same.

A bimodal polyethylene homopolymer composition consisting essentially of a higher molecular weight polyethylene homopolymer component and a lower molecular weight polyethylene homopolymer component; wherein the composition has a density from 0.961 to 0.980 gram per cubic centimeter, a melt index from 0.2 to 2.0 gram per 10 minutes, a gel permeation chromatography resolved bimodality from Log(M) 4.01 to Log(M) 4.99, an amount of the higher molecular weight component from 30 to 70 weight percent based on the combined weight of the higher molecular weight component and lower molecular weight component, and a number-average molecular weight from 3,000 to 4,990 grams per mole.

A method of making the bimodal polyethylene homopolymer composition.

A formulation consisting essentially of the bimodal polyethylene homopolymer composition and at least one additive.

A manufactured article consisting essentially of the bimodal polyethylene homopolymer composition or the formulation.

A method of making the manufactured article.

An extruded film consisting essentially of the bimodal polyethylene homopolymer composition, or the formulation, restricted in one dimension.

A method of making the extruded film.

A method of protecting a moisture-sensitive and/or oxygen-sensitive material in need of such protection.

A sealed package made by the method of protecting.

Consisting essentially of and consists essentially of mean that the inventive bimodal polyethylene homopolymer composition, formulation, and films made therefrom are free of a linear low-density polyethylene (LLDPE) and a small-molecule metal carboxylate salt, alternatively free of an LLDPE and a nucleating agent. Collectively the LLDPE and small metal carboxylate salt are the "omitted material(s)".

Linear low-density polyethylene (LLDPE). A substantially linear copolymer of ethylene and a ($C_4$, $C_6$, or $C_8$)alpha-olefin that lacks long chain branching and has a significant number of short chain branches. LLDPE is structurally and compositionally different than low-density polyethylene (LDPE), medium-density polyethylene (MDPE), and high-density polyethylene (HDPE). The LLDPE may be as described in paragraphs [0013] to [0022] of US 2019/0048155 A1, which paragraphs are incorporated here by reference.

Nucleating agent. Any small-molecule organic compound that has a formula weight of less than 1,200 g/mol ("small-molecule") and a melting temperature that is higher than the melting temperature of a polyethylene and enhances nucleation of a melt of the polyethylene. Typically the nucleating agent is a small-molecule metal carboxylate salt.

Small-molecule metal carboxylate salt. An overall neutral compound comprising a metal cation and a carboxylate anion. The metal of the metal cation is an element of any one of Groups 1 to 12 of the Periodic Table of the Elements. The carboxylate anion has at least one carboxylate group, i.e., a monovalent monoanion of formula $-CO_2^-$. The carboxylate anion typically is a monocarboxylate anion (one $-CO_2^-$) or a dicarboxylate dianion (two $-CO_2^-$). Examples of the nucleating agent are the small-molecule metal carboxylate salts magnesium or calcium cyclohexane-1,2-dicarboxylate salt (1:1), calcium stearate (1:2), calcium palmitate (1:2), zinc palmitate (1:2), zinc stearate, and combinations of any two or more thereof.

The properties of the composition and its HMW and LMW components and the film are measured according to the test methods described later.

DETAILED DESCRIPTION

The contents of the Summary are incorporated here by reference.

Certain inventive embodiments are numbered for easy cross-referencing.

Aspect 1. A bimodal polyethylene homopolymer composition consisting essentially of a higher molecular weight polyethylene homopolymer component (HMW component) and a lower molecular weight polyethylene homopolymer component (LMW component); wherein the composition has a density from 0.961 to 0.980 gram per cubic centimeter (g/cm$^3$); a melt index ($I_2$) from 0.2 to 2.0 gram per 10 minutes (g/10 min.); a gel permeation chromatography (GPC) resolved bimodality from Log(M) 4.01 to Log(M) 4.99; an amount of the HMW component from 30 to 70 weight percent (wt %) based on the combined weight of the HMW and LMW components; and a number-average molecular weight ($M_n$) from 3,000 to 4,990 grams per mole (g/mol). The composition has an amount of the LMW component equal to 100.0 wt % minus the amount of the HMW component. For example, in an embodiment wherein the amount of the HMW component is 46.5 wt %, the amount of the LMW component is 53.5 wt % (100.0-46.5=53.5).

Aspect 2. The composition of aspect 1 wherein the composition has a density from 0.961 to 0.974 g/cm$^3$, alternatively from 0.963 to 0.9674 g/cm$^3$; a melt index ($I_2$) from 0.25 to 1.6 g/10 min., alternatively from 0.537 to 1.31 g/10 min.; a GPC resolved bimodality from Log(M) 4.21 to Log(M) 4.75, alternatively from Log(M) 4.35 to Log(M) 4.60; an amount of the HMW component from 30 to 60 wt %, alternatively from 38 to 56 wt % based on the combined weight of the HMW and LMW components; and an $M_n$ from 3,060 to 4,790 g/mol, alternatively from 3,121 to 4,510 g/mol.

Aspect 3. The composition of aspect 1 or 2 wherein the composition has any one of properties (i) to (iv): (i) a melt flow ratio ($I_{21}/I_2$) from 45 to 100, alternatively from 51 to 98; (ii) a weight-average molecular weight ($M_w$) from 101,000 to 180,000 g/mol, alternatively from 117,000 to 161,000 g/mol; (iii) a molecular weight distribution ($M_w/M_n$) from 21 to 59, alternatively from 27 to 52; and (iv) a z-average molecular weight ($M_z$) from 501,000 to 999,000 g/mol, alternatively from 587,000 to 945,000 g/mol. In some aspects the composition has any one of property combinations (v) to (xii): (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv).

Aspect 4. The composition of any one of aspects 1 to 3 wherein the HMW component has any one of properties (i) to (iii): (i) an $M_n$ from 45,000 to 99,000 g/mol, alternatively from 50,500 to 89,400 g/mol; (ii) an $M_w$ from 160,000 to 390,000 g/mol, alternatively from 186,000 to 340.00 g/mol; and (iii) both (i) and (ii); or wherein the LMW component has any one of properties (iv) to (vi): (iv) an $M_n$ from 1,500 to 2,400 g/mol, alternatively from 1,600 to 2,400 g/mol; (v) an $M_w$ from 5,000 to 10,000 g/mol, alternatively from 5,400 to 9,400 g/mol; and (vi) both (iv) and (v). In some aspects the HMW component has property (i) and the LMW component has any one of properties (iv) to (vi), alternatively the HMW component has property (ii) and the LMW component has any one of properties (iv) to (vi), alternatively the HMW component has property (iii) and the LMW component has any one of properties (iv) to (vi). In some aspects the bimodal polyethylene homopolymer composition has a weight ratio of number-average molecular weight of the HMW component to number-average molecular weight of the LMW component ($M_{n-HMW}/M_{n-LMW}$ ratio) from 30 to 55, alternatively from 22 to 54, alternatively from 30.1 to 33. In some aspects the bimodal polyethylene homopolymer composition has a weight ratio of weight-average molecular weight of the HMW component to weight-average molecular weight of the LMW component ($M_{w-HMW}/M_{w-LMW}$ ratio) from 25 to 60, alternatively from 28 to 55, alternatively from 28 to 35.

Aspect 5. A method of making the bimodal polyethylene homopolymer composition, the method consisting essentially of contacting ethylene with a bimodal catalyst system in the presence of molecular hydrogen ($H_2$) at a hydrogen-to-ethylene ($H_2/C_2$) molar ratio from 0.005 to 0.025 in a single gas phase polymerization reactor containing a floating bed of resin at a temperature of 90° to 105° C.; wherein the contacting of the ethylene with the bimodal catalyst system is performed in the absence of a ($C_3$-$C_{20}$)olefin comonomer (e.g., in the absence of a ($C_3$-$C_{20}$)alpha-olefin, a butadiene, a norbornene, or a styrene); and wherein the bimodal catalyst system consists essentially of a substantially single site non-metallocene catalyst (a so-called higher molecular weight resin producing catalyst), optionally disposed on a support material, and a metallocene catalyst (a so-called lower molecular weight resin producing catalyst), optionally disposed on a support material; thereby concurrently making the HMW and LMW components so as to make the bimodal polyethylene homopolymer composition.

Aspect 6. A formulation consisting essentially of the bimodal polyethylene homopolymer composition and at least one additive. The additive(s) is/are not the HMW component, the LMW component, the linear low-density polyethylene (LLDPE), or the nucleating agent. Other than that, the at least one additive is not particularly limited. Typically the additive is useful in films. The at least one additive may be one or more of a different polyethylene homopolymer; a unimodal ethylene/alpha-olefin composition; a bimodal ethylene/alpha-olefin composition; a polypropylene polymer; an antioxidant; a catalyst neutralizer (i.e., metal deactivator); an inorganic filler (e.g., hydrophobic fumed silica, which is made by surface treating a hydrophilic fumed silica with a hydrophobic agent such as dimethyldichlorosilane); a colorant (e.g., carbon black or titanium dioxide); a stabilizer for stabilizing the formulation against effects of ultraviolet light (UV stabilizer), such as a hindered amine stabilizer (HAS); a processing aid; a slip agent (e.g., erucamide, stearamide, or behenamide); and a flame retardant. The formulation may be made by melt-blending together the composition of any one of aspects 1 to 4 and the at least one additive Aspect 7. A manufactured article consisting essentially of a shaped form of the formulation of aspect 6. The manufactured articles include containers, films, sheets, fibers, and molded articles. Molded articles may be made by injection molding, rotary molding (rotomolding), or blow molding. Examples of the manufactured articles are bottles (e.g., small part extrusion blow molded bottles), films, coatings and toy parts. The films include shrink films, cling films, stretch films, sealing films, barrier films, oriented films, food packaging, heavy-duty grocery bags, grocery sacks, medical packaging, industrial liners, and membranes. The articles have decreased water vapor transmission rate (WVTR, i.e., water permeation rate) as measured by the WVTR Test Method and decreased oxygen gas transmission rate as measured by the OGTR Test Method. This unique combination of properties enables use of the manufactured articles, including extruded films such as extruded moisture and oxygen barrier films and extruded containers such as extruded moisture and oxygen barrier containers, for protecting a moisture-sensitive and/or oxygen-sensitive material in need of such protection.

Aspect 8. A method of making a manufactured article, the method consisting essentially of shaping a melt of the formulation of aspect 6 and then cooling the shaped melt so as to make a manufactured article consisting essentially of a shaped form of the formulation. The shaping may comprise melt extruding, melt blowing, melt casting, injection molding, or rotomolding. The cooling may comprise passive (ambient) cooling or active (heat exchanger) cooling and the cooling rate may be uncontrolled or controlled.

Aspect 9. An extruded film made by extruding a melt of the formulation of aspect 6 in a film extrusion process (e.g., a blown film process or cast film process) to give a solid film consisting essentially of the formulation restricted in one dimension ("the film").

Aspect 10. A method of making an extruded film, the method consisting essentially of extruding a melt of the formulation of aspect 6 in a film extrusion process (e.g., a blown film process or cast film process) to give a solid film consisting essentially of the formulation restricted in one dimension ("the film").

Aspect 11. A method of protecting a moisture-sensitive and/or oxygen-sensitive material in need of such protection, the method comprising hermetically sealing the moisture-sensitive and/or oxygen-sensitive material inside a package consisting essentially of the extruded film of aspect 9 to give a sealed package, thereby protecting the moisture-sensitive and/or oxygen-sensitive material from water vapor and/or oxygen gas ($O_2$) that is/are located outside the sealed package.

Aspect 12. A sealed package consisting essentially of the extruded film of aspect 9 and the moisture-sensitive and/or oxygen-sensitive material that is disposed inside the sealed package, which is hermetically sealed by the extruded film.

In some aspects the moisture-sensitive and/or oxygen sensitive material is hygroscopic or prone to being hydrolyzed and/or is prone to being oxidized. Examples of the moisture-sensitive and/or oxygen-sensitive material are a dry foodstuff (e.g., cookie or breakfast cereal), a hygroscopic pharmaceutical material (e.g., hygroscopic active pharmaceutical ingredient or hygroscopic excipient), or an active pharmaceutical ingredient (API) that is prone to hydrolysis and/or oxidation. An example of an API prone to hydrolysis is fesoterodine fumarate, a compound used to treat urinary incontinence and which tends to degrade when exposed to moisture, forming among other things a deacylated compound (U.S. Pat. No. 9,629,805 B2). The extruded film in the sealed package may function as a moisture-barrier and/or oxygen-barrier film.

The composition, formulation, and film may have a water vapor transmission rate (WVTR) of from 0.15 to 0.40 (grams*25.4 micrometers)/(0.0645 $m^2$*day) (i.e., from 0.15 to 0.40 gram-mil per 100 square inches day), alternatively from 0.177 to 0.381 (grams*25.4 micrometers)/(0.0645 $m^2$*day) (i.e., from 0.177 to 0.381 gram-mil per 100 square inches day) as measured by the WVTR Test Method. The WVTR may be measured at 37.8° C., but the composition, formulation, and film are believed to also inhibit water vapor transmission at other temperatures such as from 1° to 50° C., alternatively from 10° to 40° C., alternatively from 20° to 39° C. Alternatively or additionally, the composition, formulation, and film may have an oxygen gas transmission rate (OGTR) from 90 to 220 cubic centimeters ($cm^3$)*25.4 micrometers)/(0.0645 $m^2$*day) (i.e., from 90 to 220 cubic centimeters-mil per 100 square inches per day), alternatively from 97 to 213 cubic centimeters*25.4 micrometers)/(0.0645 $m^2$*day) (i.e., from 97 to 213 cubic centimeters-mil per 100 square inches per day), as measured by the OGTR Test Method. The OGTR may be measured at 23° C. The OGTR may be measured at 23° C., but the composition, formulation, and film are believed to also inhibit oxygen gas transmission at other temperatures such as from 1° to 50° C., alternatively from 10° to 40° C., alternatively from 150° to 30° C.

Compared to a comparative composition, comparative formulation, and comparative film made from a unimodal high-density polyethylene homopolymer (e.g., UNIVAL DMDA-6400 NT 7 resin from The Dow Chemical Company, Midland, Michigan, USA) of Comparative Example 1 (CE1) described later, the inventive composition, inventive formulation, and inventive film may have a percent decrease in water vapor transmission rate (WVTR) of from 25% to 74%, alternatively from 30 to 69% as measured by the WVTR Test Method; and/or a percent decrease in oxygen gas transmission rate (OGTR) from 15% to 70%, alternatively from 17% to 63%, as measured by the OGTR Test Method.

The bimodal polyethylene homopolymer composition may be referred to as a so-called reactor blend or in situ blend. The bimodal polyethylene homopolymer composition may be inherently different in composition from that of a first comparative bimodal polyethylene homopolymer composition made by post-reactor melt blending (e.g., in an extruder) of a first comparative higher molecular weight polyethylene homopolymer made with the single site non-metallocene catalyst without the metallocene catalyst and a first comparative lower molecular weight polyethylene homopolymer made with the metallocene catalyst without the single site non-metallocene catalyst. The bimodal polyethylene homopolymer composition may be also inherently different in composition from that of a second comparative bimodal polyethylene homopolymer composition made in a dual-reactor process wherein a second comparative higher molecular weight polyethylene homopolymer is made with the single site non-metallocene catalyst without the metallocene catalyst in a first reactor, the second comparative higher molecular weight polyethylene homopolymer is then transferred to a second reactor, and a second comparative lower molecular weight polyethylene homopolymer is made with the metallocene catalyst without the single site non-metallocene catalyst in the second reactor but in the presence of the second comparative higher molecular weight polyethylene homopolymer.

The bimodal polyethylene homopolymer composition may be in melt form (a liquid) or in solid form. The solid form of the bimodal polyethylene homopolymer composition is not particularly limited. In some aspects the solid form of the bimodal polyethylene homopolymer composition may be a powder (e.g., as obtained from a polymerization reactor) or in the form of a manufactured article such as granules, pellets, a film, or a manufactured part of a manufactured article.

In an illustrative pilot plant process for making the bimodal polyethylene homopolymer composition, a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of the bimodal polyethylene homopolymer composition. Configure the FB-GPP reactor with a recycle gas line for flowing a recycle gas stream. Fit the FB-GPP reactor with gas feed inlets and polymer product outlet. Introduce gaseous feeds of ethylene and hydrogen together but without comonomer (e.g., without 1-butene or 1-hexene) below the FB-GPP reactor bed into the recycle gas line.

Polymerization operating conditions are any variable or combination of variables that may affect a polymerization reaction in the GPP reactor or a composition or property of a bimodal polyethylene homopolymer composition made thereby. The variables may include reactor design and size, catalyst composition and amount; reactant composition and amount; molar ratio of two different reactants; presence or absence of feed gases such as $H_2$ and/or $O_2$, molar ratio of feed gases versus reactants, absence or concentration of interfering materials (e.g., $H_2O$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In operating the polymerization method, control individual flow rates of ethylene ("$C_2$") and hydrogen ("$H_2$") to maintain a constant hydrogen to ethylene gas molar ratio ("$H_2/C_2$") equal to a described value (e.g., 0.008 to 0.015), and a constant ethylene ("$C_2$") partial pressure equal to a described value (e.g., 1,200 to 1,520 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2420 kilopascals (kPa) (about 340 to about 351 pounds per square inch-gauge (psig), e.g., 2413 kPa or 350.0 psig) and at a described first reactor bed temperature RBT. Maintain the fluidized bed at a constant height by withdrawing a portion of the bed at a rate equal to the rate of production of particulate form of the bimodal polyethylene homopolymer composition, which production rate may be from 10 to 30 kilograms per hour (kg/hr), alternatively 15 to 25 kg/hr. Remove the product semi-continuously via a series of valves into a fixed volume chamber, wherein this removed product is purged to remove entrained hydrocarbons and treated with a stream of humidified nitrogen ($N_2$) gas to deactivate any trace quantities of residual catalyst.

The bimodal catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

The moles of ethylene are measured by a gas flow meter or other suitable means.

Ethylene partial pressure (e.g., C2P) in the GPP reactor. The partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Induced condensing agent (ICA). An inert liquid useful for cooling materials in the polymerization reactor(s) (e.g., a fluidized bed reactor); its use is optional. The ICA may be a ($C_5$-$C_{20}$)alkane, alternatively a ($C_{11}$-$C_{20}$)alkane, alternatively a ($C_5$-$C_{10}$)alkane, alternatively a ($C_5$)alkane, e.g., pentane or 2-methylbutane; a hexane; a heptane; an octane; a nonane; a decane; or a combination of any two or more thereof. The ICA may be 2-methylbutane (i.e., isopentane). Aspects of the method of polymerization that use the ICA may be referred to as being an induced condensing mode operation (ICMO). ICMO is described in U.S. Pat. Nos. 4,453,399; 4,588,790; 4,994,534; 5,352,749; 5,462,999; and 6,489,408. Measure concentration of ICA in gas phase measured using gas chromatography by calibrating peak area percent to mole percent (mol %) with a gas mixture standard of known concentrations of ad rem gas phase components. Concentration of ICA may be from 1 to 20 mol %, alternatively from 8 to 18 mol %, alternatively from 9 to 16 (e.g., 15.9) mol %.

The polymerization method uses a gas-phase polymerization (GPP) reactor, such as a stirred-bed gas phase polymerization reactor (SB-GPP reactor) or a fluidized-bed gas-phase polymerization reactor (FB-GPP reactor), to make the bimodal polyethylene homopolymer composition. Such reactors and methods are generally well-known in the art. For example, the FB-GPP reactor/method may be as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 weight parts per million (ppmw) based on all feeds into reactor) of a static control agent and/or a continuity additive such as aluminum stearate or polyethyleneimine. The static control agent may be added to the FB-GPP reactor to inhibit formation or buildup of static charge therein.

In an embodiment the method uses a pilot scale fluidized bed gas phase polymerization reactor (Pilot Reactor) that comprises a reactor vessel containing a fluidized bed of a powder of the bimodal polyethylene homopolymer composition, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The bimodal catalyst system (e.g., a bimodal catalyst system wherein the catalysts are any one of the following combinations (a) to (c): (a) a combination of bis(butylcyclopentadienyl)zirconium dimethyl and bis(2-(pentamethylphenylamido)ethyl)-amine zirconium dibenzyl (available as PRODIGY™ BMC-300 from Univation Technologies, LLC, a subsidiary of The Dow Chemical Company, Midland, Michigan, USA); (b) a combination of (cyclopentadienyl)(4,7-dimethylindenyl)zirconium dimethyl and bis(2-(pentamethylphenylamido) ethyl)-amine zirconium dibenzyl; or (c) a combination of (cyclopentadienyl)(1,5-dimethyl-indenyl)zirconium dimethyl or dibenzyl and bis(2-(pentamethylphenylamido) ethyl)-amine zirconium dibenzyl) may be fed as a slurry or dry powder into the Pilot Reactor from high pressure devices, wherein the slurry is fed via a syringe pump and the dry powder is fed via a metered disk. The bimodal catalyst system typically enters the fluidized bed in the lower ⅓ of its bed height. The Pilot Reactor further comprises a way of weighing the fluidized bed and isolation ports (Product Discharge System) for discharging the powder of bimodal polyethylene homopolymer composition from the reactor vessel in response to an increase of the fluidized bed weight as polymerization reaction proceeds.

In some embodiments the FB-GPP reactor is a commercial scale reactor such as a UNIPOL™ reactor, which is available from Univation Technologies, LLC, a subsidiary of The Dow Chemical Company, Midland, Michigan, USA.

Catalysts, Support Materials, Activators

The bimodal catalyst system used in the method of synthesizing may consist essentially of a metallocene catalyst and a non-metallocene molecular catalyst, which are different in functional ligand and/or catalytic metal M. The bimodal catalyst system may also consist essentially of a solid support material and/or at least one activator and/or at least one activator species, which is a by-product of reacting the metallocene catalyst or non-metallocene molecular catalyst with the first activator. The metallocene catalyst of the bimodal catalyst system may be (propylcyclopentadienyl)(tetramethylcyclopentadienyl)zirconium dimethyl and the non-metallocene molecular catalyst of the bimodal catalyst system may be bis(2-(pentamethylphenylamido)ethyl)-amine zirconium dibenzyl. Such a bimodal catalyst system may be PRODIGY BMC-200, available from Univation Technologies LLC, Houston, Texas, USA. Alternatively, the metallocene catalyst of the bimodal catalyst system may be bis(butylcyclopentadienyl)zirconium dihalide and the non-metallocene molecular catalyst of the bimodal catalyst system may be bis(2-(pentamethylphenylamido)ethyl)-amine zirconium dibenzyl. Such a bimodal catalyst system may be PRODIGY BMC-300, available from Univation Technologies LLC. Alternatively, the metallocene catalyst of the bimodal catalyst system may be (cyclopentadienyl)(4,7-dimethylindenyl)zirconium dimethyl and the non-metallocene molecular catalyst of the bimodal catalyst system may be bis(2-(pentamethylphenylamido)ethyl)-amine zirconium dibenzyl. Alternatively, the metallocene catalyst of the bimodal catalyst system may be made from (cyclopentadienyl)(1,5-dimethyl-indenyl)zirconium dimethyl or dibenzyl and the non-metallocene molecular catalyst of the bimodal catalyst system may be bis(2-(pentamethylphenylamido)ethyl)-amine zirconium dibenzyl.

In an alternative embodiment of the metallocene catalyst of the bimodal catalyst system may be any one of the following metallocene catalysts: (pentamethylcyclopentadienyl)(propylcyclopentadienyl)$MX_2$; (tetramethylcyclopentadienyl)(butylcyclopentadienyl)$MX_2$; bridged $(CH_3)_2Si$(indenyl)$MX_2$; bridged $(CH_3)_2Si$(4,5,6,7-tetrahydro-indenyl)$MX_2$; (propylcyclopentadienyl)$_2MX_2$; (1-methyl-3-butylcyclopentadienyl)$_2MX_2$; wherein each M is independently zirconium (Zr) or hafnium (Hf); and wherein each X is independently selected from F, Cl, Br, I, —$CH_3$, —$CH_2CH_3$, benzyl, —$CH_2Si(CH_3)_3$, a $(C_1$-$C_5)$alkyl, and a $(C_2$-$C_5)$ alkenyl.

Without being bound by theory, it is believed that the bis(2-(pentamethylphenylamido)ethyl)-amine zirconium dibenzyl is effective for making the HMW component of the bimodal polyethylene homopolymer composition and the metallocene is independently effective for making the LMW component of the bimodal polyethylene homopolymer composition. The molar ratio of the two catalysts of the bimodal catalyst system may be based on the molar ratio of their respective catalytic metal atom (M, e.g., Zr) contents, which may be calculated from ingredient weights thereof or may be analytically measured.

The catalysts of the bimodal catalyst system may be disposed by spray-drying onto a solid support material prior to being contacted with an activator. The solid support material may be uncalcined or calcined prior to being contacted with the catalysts. The solid support material may be a hydrophobic fumed silica (e.g., a fumed silica treated with dimethyldichlorosilane). The bimodal (unsupported or supported) catalyst system may be in the form of a powdery, free-flowing particulate solid.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

Each of the catalyst compounds of the bimodal catalyst system independently may be unsupported, alternatively supported on a support material, in which latter case the bimodal catalyst system is a supported catalyst system. When each catalyst compound is supported, the catalyst compounds may reside on the same support material (e.g., same particles), or on different support materials (e.g., different particles). The bimodal catalyst system includes mixtures of unsupported catalyst compounds in slurry form and/or solution form. The support material may be a silica (e.g., fumed silica), alumina, a clay, or talc. The fumed silica may be hydrophilic (untreated), alternatively hydrophobic (treated). In some aspects the support is the hydrophobic fumed silica, which may be prepared by treating an untreated fumed silica with a treating agent such as dimethyldichlorosilane, a polydimethylsiloxane fluid, or hexamethyldisilazane. In some aspects the treating agent is dimethyldichlorosilane.

The trim catalyst may be any one of the aforementioned metallocene catalysts. For convenience the trim catalyst is fed into the reactor in solution in a hydrocarbon solvent (e.g., mineral oil or heptane). The hydrocarbon solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof.

For solubility in the hydrocarbon solvent, typically each of the group X of the trim catalyst independently is hydrocarbyl (e.g., benzyl, a $(C_1$-$C_5)$alkyl, or a $(C_2$-$C_5)$alkenyl; e.g., methyl or ethyl) or —$CH_2Si(CH_3)_3$. The groups X of the trim catalyst may be different than the X groups of the metallocene catalyst of the bimodal catalyst system. Nevertheless, upon activation by contact thereof with an activator, the active catalyst species resulting from the activation of the trim catalyst is essentially the same as the active catalyst species resulting from the activation of the metallocene catalyst of the bimodal catalyst system. For example, the metallocene catalyst of the bimodal catalyst system may be (propylcyclopentadienyl)(tetramethylcyclopentadienyl) zirconium dichloride (each X is Cl), and the trim catalyst may be (propylcyclopentadienyl)(tetramethylcyclopentadienyl)zirconium dimethyl (e.g., dimethyl wherein X is $CH_3$). In another example, the metallocene catalyst of the bimodal catalyst system may be bis(n-butylcyclopentadienyl) zirconium dichloride (each X is Cl), and the trim catalyst may be bis(n-butylcyclopentadienyl) zirconium dialkyl (e.g., dimethyl wherein X is $CH_3$). Upon activation by treatment thereof with a suitable activator or cocatalyst, both the bis(n-butylcyclopentadienyl) zirconium dichloride and the bis(n-butylcyclopentadienyl) zirconium dimethyl effectively yield the same activated catalyst species.

Activator. Each catalyst of the bimodal catalyst system is activated by contacting it with the first activator. The trim catalyst is activated by contacting it with the bimodal catalyst system containing the first activator, alternatively separately by contacting it with the second activator. Additional activators may be used. Any activator may be the same or different as another and independently may be a Lewis acid, a non-coordinating ionic activator, or an ionizing activator, or a Lewis base, an alkylaluminum, or an alkylaluminoxane (alkylalumoxane). The alkylaluminum may be a trialkylaluminum, alkylaluminum halide, or alkylaluminum alkoxide (diethylaluminum ethoxide). The trialkylaluminum may be trimethylaluminum, triethylaluminum ("TEAl"), tripropylaluminum, or tris(2-methylpropyl)aluminum. The alkylaluminum halide may be diethylaluminum chloride. The alkylaluminum alkoxide may be diethylaluminum ethoxide. The alkylaluminoxane may be a methylaluminoxane (MAO), ethylaluminoxane, 2-methylpropylaluminoxane, or a modified methylaluminoxane (MMAO). Each alkyl of the alkylaluminum or alkylaluminoxane independently may be a $(C_1-C_7)$alkyl, alternatively a $(C_1-C_6)$ alkyl, alternatively a $(C_1-C_4)$alkyl. The molar ratio of activator's metal (Al) to a particular catalyst compound's metal (catalytic metal, e.g., Zr) may be 1000:1 to 0.5:1, alternatively 300:1 to 1:1, alternatively 150:1 to 1:1. Suitable activators are commercially available.

Once the first activator and the (bis(2-(pentamethylphenylamido)ethyl)-amine zirconium dibenzyl and metallocene (e.g., (propylcyclopentadienyl)(tetramethylcyclopentadienyl)zirconium dichloride or bis(butylcyclopentadienyl)zirconium dihalide)) of the bimodal catalyst system contact each other, the catalysts of the bimodal catalyst system are activated and a first activator species may be made in situ. Once the second activator and the trim catalyst (a (propylcyclopentadienyl)(tetramethylcyclopentadienyl)zirconium dialkyl or bis(butylcyclopentadienyl)zirconium dialkyl) contact each other, the trim catalyst is activated and a second activator species may be made in situ. The activator species may have a different structure or composition than the activator from which it is derived and may be a by-product of the activation of the catalyst or may be a derivative of the by-product. The corresponding activator species may be a derivative of the Lewis acid, non-coordinating ionic activator, ionizing activator, Lewis base, alkylaluminum, or alkylaluminoxane, respectively. An example of the derivative of the by-product is a methylaluminoxane species that is formed by devolatilizing during spray-drying of a bimodal catalyst system made with methylaluminoxane.

Each contacting step between activator and catalyst independently may be done either (a) in a separate vessel outside the GPP reactor (e.g., outside the FB-GPP reactor), (b) in a feed line to the GPP reactor, and/or (c) inside the GPP reactor (in situ). In option (a) the bimodal catalyst system, once its catalysts are activated, may be fed into the GPP reactor as a dry powder, alternatively as a slurry in a non-polar, aprotic (hydrocarbon) solvent. In option (c) the bimodal catalyst system may be fed into the reactor prior to activation via a first feed line, the first activator may be fed into the reactor via a second feed line, the trim catalyst may be fed into the reactor via a third feed line, and the second activator may be fed into the reactor via a fourth feed line. Any two of the first to fourth feed lines may be the same or different. The activator(s) may be fed into the reactor in "wet mode" in the form of a solution thereof in an inert liquid such as mineral oil or toluene, in slurry mode as a suspension, or in dry mode as a powder. Each contacting step may be done in separate vessels, feed lines, or reactors at the same or different times, or in the same vessel, feed line, or reactor at different times, to separately give the bimodal catalyst system and trim catalyst. Alternatively, the contacting steps may be done in the same vessel, feed line, or reactor at the same time to give a mixture of the bimodal catalyst system and trim catalyst in situ.

The film may be unembossed or embossed. The film may be tailored for specific uses by adjusting thickness of the film, combination with other films or additives, or not. The film may be a monolayer film. The film may have a thickness from 0.0051 to 0.051 mm (0.200 mil to 2 mils), alternatively from 0.0077 mm to 0.051 mm (0.300 mil to 2 mils), alternatively from 0.0077 mm to 0.0254 mm (0.300 mil to 1.00 mils), alternatively from 0.0077 mm to 0.0203 mm (0.300 mil to 0.80 mils), alternatively from 0.0077 mm to 0.0152 mm (0.300 mil to 0.6 mils).

The film may be made using any extrusion or co-extrusion methods including blown, tentered, and cast film methods. The blown film may be made on a blown-film-line machine configured for making polyethylene films. The machine may be configured with a feed hopper in fluid communication with an extruder in heating communication with a heating device capable of heating a polyethylene in the extruder to a temperature of up to 500° C. (e.g., 430° C.), and wherein the extruder is in fluid communication with a die having an inner diameter of 10.2 to 20.3 centimeters (4 to 8 inches) and a fixed die gap (e.g., 1.0 to 1.5 millimeter gap (39 to 59 mils)), a blow up ratio of 3:1 to 5:1, and a stalk Neck Height (NH)-to-die diameter of 8:1 to 9:1. Step (a) may be done in the feed hopper.

The film may be unoriented, uniaxially oriented, or biaxially oriented. The uniaxially film may be oriented in the direction of extrusion (machine direction or MD), alternatively in the direction transverse to the direction of extrusion (transverse direction or TD). The biaxially oriented film may be oriented in both MD and TD by stretching or pulling in the MD, simultaneously or followed by stretching or pulling in the TD.

The film may have one or more improved properties such as enhanced (increased) bubble stability, enhanced (increased) MD and/or TD Elmendorf Tear performance, enhanced (increased) MD tensile strength and/or TD tensile strength, enhanced (increased) dart impact performance, or a combination of any two or more thereof.

The film may constitute a layer of a multilayer film or laminate.

The (blown) film may optionally contain zero, one or more film additives. The "film additive" is a compound or material other than a polyolefin polymer that imparts one or more properties to, and/or enhances one or more properties of, the blown film. Examples of film additives are antimicrobial agents, antioxidants, catalyst neutralizers (of single site catalysts), colorants, and light stabilizers. The film additive(s), when present, may be pre-mixed with the bimodal polyethylene homopolymer composition prior to the melting step in the method of making the blown film. Alternatively, the film additive(s) may be added to the melt of the bimodal polyethylene homopolymer composition during or after the melting step and prior to the extruding step in the method of making the blown film. When two or more film additives are used, one or more film additives may be pre-mixed with the bimodal polyethylene homopolymer composition prior to the melting step in the method of making the blown film and one or more film additives may be added to the melt of the bimodal polyethylene homopolymer composition during or after the melting step and prior to the extruding step in the method of making the blown film. The blown film may consist essentially of the bimodal polyethylene homopolymer composition, at least one antioxidant, and at least one catalyst neutralizer.

The film is useful for making containers and wraps that have enhanced puncture resistance. Examples of such containers are bags such as ice bags and grocery bags. Examples of such wraps are stretch films, meat wraps, and food wraps.

The bimodal polyethylene homopolymer composition is also useful in a variety of non-film related applications including in vehicle parts.

Activator. A substance, other than the catalyst or one of the substrates, that increases the rate of a catalyzed reaction without itself being consumed. Typically, the activator contains aluminum and/or boron.

Alkyl groups are named using IUPAC nomenclature. E.g., methyl, ethyl, propyl, butyl, pentyl, and hexyl mean compounds of formula —$(CH_2)_n CH_3$, wherein subscript n is 0, 1, 2, 3, 4, or 5, respectively. Prefixes iso, tert, tertiary, normal, n-, secondary, sec- and the like are not used except parenthetically as reference. E.g., 1-methylethyl is used instead of isopropyl, 1,1-dimethylethyl instead of tert-butyl, and so on.

Bimodal in reference to a polymer composition (e.g., the bimodal polyethylene homopolymer composition) means a polymer composition consisting essentially of a higher molecular weight component and a lower molecular weight component, which components are characterized by the two peaks in a plot of dW/dLog(MW) on the y-axis versus Log(MW) on the x-axis to give a Gel Permeation Chromatograph (GPC) chromatogram, wherein Log(MW) and dW/dLog(MW) are as defined herein and are measured by Gel Permeation Chromatography (GPC) Test Method.

Bimodal when referring to a catalyst system (e.g., the bimodal catalyst system) means a catalyst system that contains two different catalysts for catalyzing a polymerization process (e.g., olefin polymerization) and producing a bimodal polymer composition. Two catalysts are different if they differ from each other in at least one of the following characteristics: (a) their catalytic metals are different (Ti versus Zr, Zr versus Hf, Ti versus Hf; not activator metals such as Al); (b) one catalyst has a functional ligand covalently bonded to its catalytic metal and the other catalyst is free of functional ligands bonded to its catalytic metal; (c) both catalysts have functional ligands covalently bonded to their catalytic metal and the structures of at least one of functional ligand of one of the catalysts is different than the structure of each of the functional ligand(s) of the other catalyst (e.g., cyclopentadienyl versus propylcyclopentadienyl or butylcyclopentadienyl versus bis[(pentamethylphenylamido)ethyl)]amine; and (d) for catalysts disposed on a support material, the compositions of the support materials are different. Functional ligands do not include leaving groups X or $R^1$ as defined herein. A bimodal catalyst system may be unsupported or supported on a support material. The two catalysts of a bimodal catalyst system may be disposed on the same support material, either on the same particles of the same support material or each on different particles of the same support material. The same catalyst in terms of catalytic metal and ligands wherein a portion thereof is disposed on a support material and a different portion thereof is dissolved in an inert solvent, the different portions do not by themselves constitute a bimodal catalyst system.

1-Butene. A polymerizable monomer of formula $H_2C$=C$(H)CH_2CH_3$.

Catalyst system. A combination of an activated catalyst per se and a companion material such as a modifier compound for attenuating reactivity of the catalyst, a support material on which the catalyst is disposed, a carrier material in which the catalyst is disposed, or a combination of any two or more thereof, or a reaction product of a reaction thereof.

Dry. Generally, a moisture content from 0 to less than 5 parts per million based on total parts by weight. Materials fed to the reactor(s) during a polymerization reaction are dry.

Ethylene. A polymerizable monomer of formula $H_2C$=$CH_2$.

Feed. Quantity of reactant or reagent that is added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Feed line. A pipe or conduit structure for transporting a feed.

Film: an article restricted in one dimension. The restricted dimension may be called a thickness of the film, and the thickness (gauge variation) is substantially uniform therein. Claimed film properties are measured on 13 (12.7) micrometers thick monolayer films.

1-Hexene. A polymerizable monomer of formula $H_2C$=C$(H)CH_2CH_2CH_3$.

Inert. Generally, not (appreciably) reactive or not (appreciably) interfering therewith in the inventive polymerization reaction. The term "inert" as applied to the purge gas or ethylene feed means an oxygen gas ($O_2$) content from 0 to less than 5 parts per million based on total parts by weight of the purge gas or ethylene feed.

Internal bubble cooling or IBC is an aspect of film blowing performed by actively using ancillary, special purpose IBC equipment such as that of US 2002/0150648 A1 to R. E. Cree.

Higher and lower descriptors in the HMW and LMW components mean the weight-average molecular weight of the HMW component ($M_{wH}$) is greater than the weight-average molecular weight of the LMW component ($M_{wL}$).

Metallocene catalyst. Homogeneous or heterogeneous material that contains a cyclopentadienyl ligand-metal complex and enhances olefin polymerization reaction rates. Substantially single site or dual site. Each metal is a transition metal Ti, Zr, or Hf. Each cyclopentadienyl ligand independently is an unsubstituted cyclopentadienyl group or a hydrocarbyl-substituted cyclopentadienyl group. The metallocene catalyst may have two cyclopentadienyl ligands, and at least one, alternatively both cyclopentenyl ligands independently is a hydrocarbyl-substituted cyclopentadienyl group. Each hydrocarbyl-substituted cyclopentadienyl group may independently have 1, 2, 3, 4, or 5 hydrocarbyl substituents. Each hydrocarbyl substituent may independently be a ($C_1$-$C_4$)alkyl. Two or more substituents may be bonded together to form a divalent substituent, which with carbon atoms of the cyclopentadienyl group may form a ring.

Molecular hydrogen. A compound of formula $H_2$.

Oxygen gas. A gaseous form of compound of formula $O_2$.

Single-site catalyst. An organic ligand-metal complex useful for enhancing rates of polymerization of olefin monomers and having at most two discrete binding sites at the metal available for coordination to an olefin monomer molecule prior to insertion on a propagating polymer chain.

Single-site non-metallocene catalyst. A substantially single-site or dual site, homogeneous or heterogeneous material that is free of an unsubstituted or substituted cyclopentadienyl ligand, but instead has one or more functional ligands such as a nitrogen atom-containing ligands.

Ziegler-Natta catalysts. Heterogeneous materials that enhance olefin polymerization reaction rates and are prepared by contacting inorganic titanium compounds, such as titanium halides supported on a magnesium chloride support, with an activator.

Any compound, composition, formulation, mixture, or product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that any required chemical elements (e.g., C and H required by a polyolefin; or C, H, and O required by an alcohol) are not excluded.

Alternatively precedes a distinct embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23° C.±1° C.

EXAMPLES

Deconvoluting Test Method: Fit a GPC chromatogram of a bimodal polyethylene into a high molecular weight (HMW) component fraction and low molecular weight (LMW) component fraction using a Flory Distribution that was broadened with a normal distribution function as follows. For the log M axis, establish 501 equally-spaced Log(M) indices, spaced by 0.01, from Log(M) 2 and Log(M) 7, which range represents molecular weight from 100 to 10,000,000 grams per mole. Log is the logarithm function to the base 10. At any given Log(M), the population of the Flory distribution is in the form of the following equation:

$$dW_f = \left(\frac{2}{M_w}\right)^3 \left(\frac{M_w}{0.868588961964}\right) M^2 e^{(-2M/M_w)},$$

wherein $M_w$ is the weight-average molecular weight of the Flory distribution; M is the specific x-axis molecular weight point, (10^[Log(M)]); and $dW_f$ is a weight fraction distribution of the population of the Flory distribution. Broaden the Flory distribution weight fraction, $dW_f$, at each 0.01 equally-spaced log(M) index according to a normal distribution function, of width expressed in Log(M), σ; and current M index expressed as Log(M), μ.

$$f_{(LogM, \mu, \sigma)} = \frac{e^{-\frac{(LogM-\mu)^2}{2\sigma^2}}}{\sigma\sqrt{2\pi}}.$$

Before and after the spreading function has been applied, the area of the distribution ($dW_f$/dLogM) as a function of Log(M) is normalized to 1. Express two weight-fraction distributions, $dW_{f-HMW}$ and $dW_{f-LMW}$, for the HMW copolymer component fraction and the LMW copolymer component fraction, respectively, with two unique $M_w$ target values, $M_{w-HMW}$ and $M_{w-LMW}$, respectively, and with overall component compositions $A_{HMW}$ and $A_{LMW}$, respectively. Both distributions were broadened with independent widths, σ (i.e., $\alpha_{HMW}$ and $\alpha_{LMW}$, respectively). The two distributions were summed as follows: $dW_f = A_{HMW} dw_{fHMW} + A_{LMW} dW_{fLMW}$, wherein $A_{HMW} + A_{LMW} = 1$. Interpolate the weight fraction result of the measured (from conventional GPC) GPC molecular weight distribution along the 501 log M indices using a 2nd-order polynomial. Use Microsoft Excel™ 2010 Solver to minimize the sum of squares of residuals for the equally-spaces range of 501 Log M indices between the interpolated chromatographically determined molecular weight distribution and the three broadened Flory distribution components ($\alpha_{HMW}$ and $\alpha_{LMW}$), weighted with their respective component compositions, $A_{HMW}$ and $A_{LMW}$. The iteration starting values for the components are as follows: Component 1: Mw=30,000, α=0.300, and A=0.500; and Component 2: Mw=250,000, σ=0.300, and A=0.500. The bounds for components $\sigma_{HMW}$ and $\sigma_{LMW}$ are constrained such that σ>0.001, yielding an $M_w/M_n$ of approximately 2.00 and σ<0.500. The composition, A, is constrained between 0.000 and 1.000. The $M_w$ is constrained between 2,500 and 2,000,000. Use the "GRG Nonlinear" engine in Excel Solver™ and set precision at 0.00001 and convergence at 0.0001. Obtain the solutions after convergence (in all cases shown, the solution converged within 60 iterations).

Density is measured according to ASTM D792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm³).

Gel permeation chromatography (GPC) Test Method: Use a PolymerChar GPC-IR (Valencia, Spain) high temperature GPC chromatograph equipped with an internal IR5 infra-red detector (IR5). Set temperatures of the autosampler oven compartment at 160° C. and column compartment at 150° C. Use a column set of four Agilent "Mixed A" 30 cm 20-micron linear mixed-bed columns; solvent is 1,2,4 trichlorobenzene (TCB) that contains 200 ppmw of butylated hydroxytoluene (BHT) sparged with nitrogen. Injection volume is 200 microliters. Set flow rate to 1.0 milliliter/minute. Calibrate the column set with at least 20 narrow molecular weight distribution polystyrene (PS) standards (Agilent Technologies) arranged in six "cocktail" mixtures with approximately a decade of separation between individual molecular weights with molecular weights ranging from 580 to 8,400,000 in each vial. Convert the PS standard peak molecular weights to polyethylene molecular weights the method described in Williams and Ward, J. Polym. Sci., Polym. Let., 6, 621 (1968) where MPE=MPS×Q (where Q ranges between 0.39 to 0.44 to correct for column band-broadening) based on a linear homopolymer polyethylene molecular weight standard of approximately 120,000 and a polydispersity of approximately 3, which is measured independently by light scattering for absolute molecular weight. Prepare solution samples at 2 mg/mL in TCB solvent at 160° C. with mixing for 2 hours. Calculate number-average molecular weight ($M_n$ or $M_{n(GPC)}$), weight-average molecular weight ($M_w$ or $M_{w(GPC)}$), and z-average molecular weight ($M_z$ or $M_{z(GPC)}$) based on GPC results using the internal IR5 detector (measurement channel) with Polymer-Char GPCOne™ software.

High Load Melt Index (HLMI) $I_{21}$ Test Method: use ASTM D1238-13, Standard Test Method for Melt Flow Rates of Thermoplastics by Extrusion Platometer, using conditions of 190° C./21.6 kilograms (kg). Report results in units of grams eluted per 10 minutes (g/10 min.).

Melt Index ("$I_2$") Test Method: for ethylene-based (co)polymer is measured according to ASTM D1238-13, using conditions of 190° C./2.16 kg, formerly known as "Condition E".

Melt Flow Ratio MFR2: ("$I_{21}/I_2$") Test Method: calculated by dividing the value from the HLMI $I_{21}$ Test Method by the value from the Melt Index $I_2$ Test Method.

For property measurements, samples are prepared into test specimens, plaques, or sheets according to ASTM D4703-10, Standard Practice for Compression Molding Thermoplastic Materials into Test Specimens, Plaques, or Sheets.

Oxygen gas transmission Rate (OGTR) Test Method: measured with a Mocon Ox-Tran instrument according to ASTM D3985-17 (Standard Test Method for Oxygen Gas Transmission Rate Through Plastic Film and Sheeting Using a Coulometric Sensor) at 23° C., 90% relative humidity, on a film having a thickness of about 25.4 micrometers (μm).

Test Film Pre-Conditioning Method: Prior to properties testing, each film was pre-conditioned for at least 40 hours at 23°±2° C. and 50%±10% relative humidity.

Water Vapor Transmission Rate (WVTR) Test Method: measured with a Mocon W3/33 instrument according to ASTM F1249-06 (Standard Test Method for Water Vapor Transmission Rate Through Plastic Film and Sheeting Using a Modulated Infrared Sensor) at 37.8° C., 90% relative humidity, on a film having a thickness of about 25.4 micrometers (μm).

Materials Used in Examples

Antioxidants: 1. octadecyl 3-(3,5-di(1',1'-dimethylethyl)-4-hydroxyphenyl)propionate; obtained as IRGANOX 1076 from BASF. 2. Tris(2,4-di(1',1'-dimethylethyl)-phenyl)phosphite. Obtained as IRGAFOS 168 from BASF.

Catalyst Neutralizer 1. Calcium stearate.

Bimodal Catalyst System 1 (BCS1): the PRODIGY™ BMC-300 catalyst system. Available from Univation Technologies LLC, Houston, Texas, USA.

Bimodal Catalyst System 2 (BCS2): the metallocene catalyst is (cyclopentadienyl)(4,7-dimethylindenyl)zirconium dimethyl and the non-metallocene molecular catalyst is bis(2-(pentamethylphenylamido)ethyl)-amine zirconium dibenzyl.

Trim Catalyst 1 (TC1): a diluted solution of bis(butylcyclopentadienyl)zirconium dimethyl in an alkanes mixture, wherein the diluted solution is made by adding isopentane to UT-TR-300 solution obtained from Univation Technologies LLC, Houston, Texas, USA.

Trim Catalyst 2 (TC2) a solution of (cyclopentadienyl)(4,7-dimethylindenyl)zirconium dimethyl dissolved in an alkanes mixture.

Comonomer: none.

Ethylene ("$C_2$"): See later for partial pressure of $C_2$.

Molecular hydrogen gas ("$H_2$"): See later for $H_2/C_2$ gas molar ratio.

Comparative Example 1 (CE1): a unimodal high-density polyethylene homopolymer having a density of 0.961 g/cm³ and a melt index ($I_2$) of 0.81 g/10 min. Obtained as UNIVAL DMDA-6400 NT 7 resin from The Dow Chemical Company.

Inventive Examples 1 to 4 (IE1 to IE4): polymerization procedure: Runs began with Bimodal Catalyst System 2 (IE1) or Bimodal Catalyst System 1 (IE2 to IE4) according to the Pilot Reactor and method described earlier to give in different parts, as described below, different embodiments of the bimodal polyethylene homopolymer composition as granular resins and having targeted properties reported below in Table 1 (IE1 to IE4).

TABLE 1

Operating conditions for IE1 to IE4.

|  | IE1 | IE2 | IE3 | IE4 |
|---|---|---|---|---|
| Bimodal Catalyst System | BCS2 | BCS1 | BCS1 | BCS1 |
| Part | 4X | 3aX | 5X | 5bX |
| Reactor Type | S, CM, PP, FB GPP* | S, CM, PP, FB GPP | S, CM, PP, FB GPP | S, CM, PP, FB GPP |
| Reactor Purging gas | Anhydrous $N_2$ | Anhydrous $N_2$ | Anhydrous $N_2$ | Anhydrous $N_2$ |
| Bed Temp. (° C.) | 105 | 105 | 105 | 105 |
| Rx Pressure (kpa)^ | 2413 | 2413 | 2413 | 2413 |
| $C_2$ Partial Pressure (kpa) | 1516 | 1516 | 1516 | 1516 |
| $H_2/C_2$ Molar Ratio | 0.008 | 0.015 | 0.010 | 0.010 |
| $C_4/C_2$ Molar Ratio | 0.000 | 0.000 | 0.000 | 0.000 |
| $C_6/C_2$ Molar Ratio | 0.000 | 0.000 | 0.000 | 0.000 |
| Induced Conden. Agent 1-methylbutane (mol %) | 10.2 | 13.7 | 15.7 | 12.7 |
| Superficial Gas Velocity (m/sec) | 0.66 | 0.56 | 0.55 | 0.56 |
| Trim catalyst | TC2 | TC1 | TC1 | TC1 |

TABLE 1-continued

Operating conditions for IE1 to IE4.

| | IE1 | IE2 | IE3 | IE4 |
|---|---|---|---|---|
| Catalyst Zr conc. (wt %) | 0.32 | 0.47 | 0.47 | 0.46 |
| Catalyst Al conc. (wt %) | 16.0 | 16.1 | 16.1 | 16.8 |
| Fluidized Bed Weight (kg) | 45.5 | 48.2 | 49.6 | 50.4 |
| Homopolymer Production Rate (kg/hour) | 17.9 | 19.1 | 22.9 | 18.8 |
| Homopolymer Residence Time (hour) | 2.6 | 2.5 | 2.2 | 2.7 |
| Post-reactor $O_2$ tailoring level (%) (in LCM100 Extruder) | none | none | none | none |

*S, CM, PP, FB, GPP: single, continuous mode, pilot plant, fluidized bed gas phase polymerization.
^Rx Pressure (kPa): reactor total pressure in kilopascals.

Formulation and Pelletization Procedure: In a ribbon blender, mix granular resin, as produced in the gas phase reactor, with 300 ppmw Antioxidant 1, 600 ppmw Antioxidant 2, and 2,000 ppmw Catalyst Neutralizer 1. Melt-compound the mixture in a ZSK-40 twin-screw extruder to give an extruded strand, and cut the strand into pellets to give the formulation in pellets form. The resulting pellets of each resin were tested for melt properties in Table 3.

TABLE 3

Melt properties of CE1 and IE1 to IE4.

| Test | CE1 | IE1 | IE2 | IE3 | IE4 |
|---|---|---|---|---|---|
| Post-reactor $O_2$ tailoring level (%) (in LCM100 Extruder) | None | None | None | None | None |
| $I_2$ (190° C., 2.16 kg) (g/10 min.) | 0.81 | 0.54 | 1.3 | 0.93 | 1.2 |

As shown in Table 3, the melt indices of the unimodal HDPE of CE1 and of the bimodal polyethylene homopolymer composition of IE1 to IE4 range from 0.54 g/10 min. to 1.3 g/10 min., which means the compositions are suitable for making blown films on conventional blown film manufacturing lines.

Pelleted resins of CE1 and IE1 to IE4 were tested for resin properties; see Table 4.

In Table 4, N/a means not applicable. As shown in Table 4, the resin properties of the unimodal HDPE of CE1 and of the bimodal polyethylene homopolymer composition of IE1 to IE4 may be compared with each other. The inventive compositions of IE1 to IE4 contained significant amounts of each of HMW and LMW components with clearly resolved bimodality and have overall composition $M_n$ less than 4,999 g/mol. The comparative composition of CE1 had an overall composition $M_n$ of 14,800 g/mol.

Film Forming Procedure: Configured a blown-film-line machine for making polyethylene films with a feed hopper in fluid communication with an extruder in heating communication with a heating device heated to a temperature of 220° C. The extruder is in fluid communication with a die having a fixed die gap of 1.778 millimeter (70.00 mils), a die diameter of 20.3 cm (8 inches), and a blow-up ratio of 2.5:1. The Frost Line Height (FLH) is 58.4±2.5 centimeters (23±1 inches) from the die. Pellets of granular resins of the unimodal HDPE of CE1 and the bimodal polyethylene homopolymer composition of IE1 to IE4 are separately melted at melt temperature described herein, and separately blown into films on the blown-film line using a melted composition feed rate, and film production rate, of 91 kg per hour (kg/hour, 200 pounds/hour) at a melt temperature of 202°±1° C. and an extruder rate of 30-45 revolutions per

TABLE 4

Resin properties of CE1 and IE1 to IE4.

| Test | CE1 | IE1 | IE2 | IE3 | IE4 |
|---|---|---|---|---|---|
| Overall Composition Density (g/cm³) | 0.961 | 0.967 | 0.963 | 0.965 | 0.964 |
| HMW Component Amount (wt %) | N/a | 46.5 | 61.1 | 48.2 | 44.6 |
| LMW Component Amount (wt %) | N/a | 53.5 | 58.9 | 51.8 | 55.4 |
| Overall Composition GPC Resolved Bimodality Local Minimum (Log M) | N/a | 4.5 | 4.35 | 4.56 | 4.6 |
| Overall Composition $M_n$ (g/mol) | 14,800 | 3,121 | 4,211 | 4,510 | 4,318 |
| Overall Composition $M_w$ (g/mol) | 106,190 | 160,466 | 117,216 | 131,915 | 124,737 |
| Overall Composition $M_w/M_n$ (Đm) | 7.2 | 51.4 | 27.8 | 29.2 | 28.9 |
| Overall Composition $M_z$ (kg/mol) | 553 | 944 | 588 | 778 | 804 |
| HMW Component $M_{n\text{-}HMW}$ (g/mol) | N/a | 89,105 | 50,877 | 75,838 | 76,702 |
| HMW Component $M_{w\text{-}HMW}$ (g/mol) | N/a | 339,300 | 186,965 | 262,304 | 265,957 |
| LMW Component $M_{n\text{-}LMW}$ (g/mol) | N/a | 1,657 | 1,644 | 2,311 | 2,359 |
| LMW Component $M_{w\text{-}LMW}$ (g/mol) | N/a | 6,244 | 5,487 | 9,300 | 9,307 |
| $M_{n\text{-}HMW}/M_{n\text{-}LMW}$ ratio | N/a | 53.8 | 30.9 | 32.8 | 32.5 |
| $M_{w\text{-}HMW}/M_{w\text{-}LMW}$ ratio | N/a | 54.3 | 34.1 | 28.2 | 28.6 | minute (rpm). The water vapor transmission rate and oxygen gas transmission rate properties were measured on films having a thickness of 0.0254 millimeter (mm)=25 micrometer (μm) and according to the aforementioned test methods. See below Table 5.

TABLE 5

Film properties of CE1 and IE1 to IE4.

| Test | CE1 | IE1 | IE2 | IE3 | IE4 |
|---|---|---|---|---|---|
| Water Vapor Transmission Rate (WVTR) (grams * 25.4 micrometers)/ (0.0645 m² * day) | 0.554 | 0.381 | 0.177 | 0.239 | 0.252 |
| Reduction in WVTR relative to CE1 (%) | N/a | 31.2 | 68.1 | 56.9 | 54.5 |
| Oxygen gas transmission Rate (OGTR) (cubic centimeters * 25.4 micrometers)/ (0.0645 m² * day) | 256 | 161 | 97.0 | 126 | 212 |
| Reduction in OGTR relative to CE1 (%) | N/a | 37.2 | 62.2 | 50.8 | 17.2 |

N/a means not applicable. As shown in Table 5, the film properties of the blown films of the unimodal HDPE of CE1 and of the bimodal polyethylene homopolymer composition of IE1 to IE4 are comparable with each other. The films made from the inventive compositions of IE1 to IE4 have WVTR and OGTR that are significantly less than the WVTR and OGTR of the film made from the comparative composition of CE1. This indicates that the films of the inventive compositions of IE1 to IE4 provide improved barriers to (increased inhibition of transmission of) water vapor and oxygen gas.

The invention claimed is:

1. A bimodal polyethylene homopolymer composition consisting essentially of a higher molecular weight polyethylene homopolymer component (HMW component) and a lower molecular weight polyethylene homopolymer component (LMW component); wherein the composition has a density from 0.961 to 0.980 gram per cubic centimeter (g/cm³); a melt index ($I_2$) from 0.2 to 2.0 gram per 10 minutes (g/10 min.); a gel permeation chromatography (GPC) resolved bimodality from Log (M) 4.01 to Log (M) 4.99; an amount of the HMW component from 30 to 70 weight percent (wt %) based on the combined weight of the HMW and LMW components; and a number-average molecular weight ($M_n$) from 3,000 to 4,990 grams per mole (g/mol).

2. The composition of claim 1 wherein the composition has a density from 0.961 to 0.974 g/cm³; a melt index ($I_2$) from 0.25 to 1.6 g/10 min.; a GPC resolved bimodality from Log (M) 4.21 to Log (M) 4.75; an amount of the HMW component from 30 to 60 wt % based on the combined weight of the HMW and LMW components; and an $M_n$ from 3,060 to 4,790 g/mol.

3. The composition of claim 1 wherein the composition has any one of properties (i) to (iv): (i) a melt flow ratio ($I_{21}/I_2$) from 45 to 100; (ii) a weight-average molecular weight ($M_w$) from 101,000 to 180,000 g/mol; (iii) a molecular weight distribution ($M_w/M_n$) from 21 to 59; and (iv) a z-average molecular weight ($M_z$) from 501,000 to 999,000 g/mol.

4. The composition of claim 1 wherein the HMW component has any one of properties (i) to (iii): (i) an $M_n$ from 45,000 to 99,000 g/mol; (ii) an $M_w$ from 160,000 to 390,000 g/mol; and (iii) both (i) and (ii); or wherein the LMW component has any one of properties (iv) to (vi): (iv) an $M_n$ from 1,500 to 2,400 g/mol; (v) an $M_w$ from 5,000 to 10,000 g/mol; and (vi) both (iv) and (v).

5. A method of making the bimodal polyethylene homopolymer composition of claim 1, the method consisting essentially of contacting ethylene with a bimodal catalyst system in the presence of molecular hydrogen ($H_2$) at a hydrogen-to-ethylene ($H_2/C_2$) molar ratio from 0.005 to 0.025 in a single gas phase polymerization reactor containing a floating bed of resin at a temperature of 90° to 105° C.; wherein the contacting of the ethylene with the bimodal catalyst system is performed in the absence of a ($C_3$-$C_{20}$) olefin comonomer; and wherein the bimodal catalyst system consists essentially of a substantially single site non-metallocene catalyst, optionally disposed on a support material, and a metallocene catalyst, optionally disposed on a support material; thereby concurrently making the HMW and LMW components so as to make the bimodal polyethylene homopolymer composition.

6. A formulation consisting essentially of the bimodal polyethylene homopolymer composition of claim 1 and at least one additive.

7. A manufactured article consisting essentially of a shaped form of the formulation of claim 6.

8. A method of making a manufactured article, the method consisting essentially of shaping a melt of the formulation of claim 6 and then cooling the shaped melt so as to make a manufactured article consisting essentially of a shaped form of the formulation.

9. An extruded film made by extruding a melt of the formulation of claim 6 in a film extrusion process to give a solid film consisting essentially of the formulation restricted in one dimension.

10. A method of making an extruded film, the method consisting essentially of extruding a melt of the formulation of claim 6 in a film extrusion process to give a solid film consisting essentially of the formulation restricted in one dimension.

11. A method of protecting a moisture-sensitive and/or oxygen-sensitive material in need of such protection, the method comprising hermetically sealing the moisture-sensitive and/or oxygen-sensitive material inside a package consisting essentially of the extruded film of claim 9 to give a sealed package, thereby protecting the moisture-sensitive and/or oxygen-sensitive material from water and/or oxygen gas that is/are located outside the sealed package.

12. A sealed package consisting essentially of the extruded film of claim 9 and the moisture-sensitive and/or oxygen-sensitive material that is disposed inside the sealed package, which is hermetically sealed by the extruded film.

* * * * *